United States Patent
Meyer et al.

(10) Patent No.: US 8,073,781 B2
(45) Date of Patent: Dec. 6, 2011

(54) METHOD AND DEVICE FOR FRANKING POSTAL DELIVERIES

(75) Inventors: Bernd Meyer, Konigswinter (DE); Juergen Lang, Bergisch-Gladbach (DE)

(73) Assignee: Deutsche Post AG, Bonn (DE)

( * ) Notice: Subject to any disclaimer, the term of this patent is extended or adjusted under 35 U.S.C. 154(b) by 709 days.

(21) Appl. No.: 11/660,240

(22) PCT Filed: Jul. 25, 2005

(86) PCT No.: PCT/EP2005/008067
§ 371 (c)(1),
(2), (4) Date: Feb. 13, 2007

(87) PCT Pub. No.: WO2006/018097
PCT Pub. Date: Feb. 23, 2006

(65) Prior Publication Data
US 2007/0276761 A1 Nov. 29, 2007

(30) Foreign Application Priority Data
Aug. 13, 2004 (DE) .......................... 10 2004 039 547

(51) Int. Cl.
*G06Q 20/00* (2006.01)
(52) U.S. Cl. .................................. 705/60; 705/67; 726/4
(58) Field of Classification Search ................ 705/60–62
See application file for complete search history.

(56) References Cited

U.S. PATENT DOCUMENTS

| | | | |
|---|---|---|---|
| 5,233,657 A | | 8/1993 | Günther .......................... 380/23 |
| 5,454,038 A | * | 9/1995 | Cordery et al. ................. 705/60 |
| 5,742,683 A | * | 4/1998 | Lee et al. ........................ 705/60 |
| 5,988,897 A | * | 11/1999 | Pierce et al. ..................... 400/61 |
| 6,098,058 A | * | 8/2000 | Gravell et al. ................ 705/410 |
| 6,192,473 B1 | * | 2/2001 | Ryan et al. .................... 713/168 |
| 6,813,613 B1 | * | 11/2004 | Lee et al. ........................ 705/60 |

(Continued)

FOREIGN PATENT DOCUMENTS
DE 40 34 292 4/1992
(Continued)

OTHER PUBLICATIONS

English translation of the International Preliminary Examination Report on Patentability issued in PCT/EP2005/008067.

*Primary Examiner* — Jamie Kucab
(74) *Attorney, Agent, or Firm* — Marshall, Gerstein & Borun LLP

(57) ABSTRACT

A method and device for franking mailpieces. An operating unit, which is separated from a franking unit, transmits a transaction request to an authorization unit. The authorization unit ascertains an authorization of a user of the operating unit on the basis of an authorization profile. The transmitted transaction request is authenticated by the authorization unit according to the ascertained authorization. The authorization unit converts the authenticated transaction request into a transaction job. The transaction job is transmitted to the franking unit. The authorization unit is authenticated in the area of the franking unit. The transaction job is processed in the franking unit and the result of the execution of the transaction job is sent out by the franking unit.

5 Claims, 2 Drawing Sheets

U.S. PATENT DOCUMENTS

| | | | | |
|---|---|---|---|---|
| 6,971,007 B1 * | 11/2005 | Currans | ............................ | 713/165 |
| 7,113,928 B1 * | 9/2006 | L'Hote et al. | ...................... | 705/60 |
| 7,233,929 B1 * | 6/2007 | Lingle et al. | ...................... | 705/402 |
| 7,316,030 B2 * | 1/2008 | Audebert et al. | .................. | 726/14 |
| 2004/0028233 A1 | 2/2004 | Meyer et al. | .................... | 380/277 |
| 2005/0166061 A1 * | 7/2005 | Brookner et al. | ................ | 713/184 |

FOREIGN PATENT DOCUMENTS

| | | |
|---|---|---|
| DE | 100 20 566 | 10/2001 |
| WO | WO-99/48053 | 9/1999 |
| WO | WO-00/19382 | 4/2000 |
| WO | WO-01/45051 | 6/2001 |

* cited by examiner

METHOD AND DEVICE FOR FRANKING POSTAL DELIVERIES

BACKGROUND OF THE INVENTION

1. Field of the Invention

The invention relates to a method for franking mailpieces, especially letters, parcels and packages, whereby an operating unit is operated separately from a franking unit.

The invention also relates to a device for franking mailpieces comprising an operating unit and a franking unit.

2. Related Technology

A method of the generic type and a device of the generic type are known from DE 100 20 566 C2. In this known method, a cryptographic module integrated into a customer system generates an encrypted random number and an identification number. A loading center decrypts the random number and the identification number. On this basis, the customer or the customer system used by the customer is identified. Subsequently, the loading center encrypts the random number as well as a default identification number and transmits it to the customer system. Then the customer system generates postage indicia containing the encrypted random number and the likewise encrypted default identification number.

An example of such a franking system is the STAMPIT system of the Deutsche Post AG. STAMPIT consists of software named "STAMPIT Client" that is installed on the PC of every STAMPIT customer and of a central system operated in a computer center of the Deutsche Post named "STAMPIT Server". The STAMPIT Client serves as the operating unit and the STAMPIT Server as the franking unit. Both units are connected to each other via the Internet. When a customer would like to produce a postage indicium, a request is sent via the network connection from the STAMPIT Client to the STAMPIT Server. The latter generates the postage indicium as an electronic byte string in a highly secure cryptographic module. After the byte string has been transmitted back from the STAMPIT Server to the STAMPIT Client, the cryptographically secure byte string is converted there into a machine-readable barcode and this barcode is printed out together with other data to produce a valid PC postage indicium.

This known method makes it possible for users of personal computers to load postage amounts via the Internet and to generate postage indicia using the loaded postage amounts.

Another method of the generic type is disclosed in WO 01/45051 A1 relating specifically to a system for generating digital postage indicia wherein a client computer is connected to a postage server via the Internet. The postage server comprises cryptographic modules in which cryptographic components of digital postage indicia are generated, and said postage server is, in turn, connected to a system of the United States Postal Service. The client computers are equipped with software for executing postage procedures and users are licensed by the USPS and registered in the postage server. Requests to print out digital postage indicia are sent from the client computers to the postage server where, in particular, it is checked whether the client computer or the user is authorized to print out postage indicia. For this purpose, the client computer sends a password entered by the user to the postage server.

WO 99/48053 discloses a system wherein a user system is connected to a PSD (postal security device). This device, in turn, is connected to a producer system via which a postage credit can be loaded, whereby the producer system is connected to a system of a postal authority. In order to license a user, a request for licensing is sent to a PSD which then transmits a signed request message to a producer system. This system verifies the signature and requests a license from the postal authority that is then sent to the PSD and registered there.

Moreover, DE 40 34 292 A1 describes a method for franking mailpieces in which postage indicia can be generated by a franking unit in a remote copier, whereby the franking unit is connected to a data processing center in order to request franking data and to transact postage charges, said franking unit exchanging encrypted messages with said data processing center.

GENERAL DESCRIPTION OF THE INVENTION

The invention provides a franking method with which franking-relevant processes can be carried out by multiple users of a computer network.

The invention provides a method for franking mailpieces, where an operating unit is operated separately from a franking unit, the operating unit transmits a transaction request to an authorization unit, the authorization unit ascertains an authorization of an user of the operating unit on the basis of an authorization profile, the transmitted transaction request is authenticated by the authorization unit according to the ascertained authorization, the authorization unit converts the authenticated transaction request into a transaction job, the transaction job is transmitted to a franking unit, the authorization unit is authenticated in the area of the franking unit, the transaction job is processed in the franking unit and the result of the execution of the transaction job is sent out by the franking unit.

The invention provides a device for franking mailpieces using an operating unit and a franking unit, where the operating unit and the franking unit are spatially separated from each other, the operating unit and the franking unit are connected to each other via a data line and this connection is configured in such a way that an authorization unit is located in the connection line. The operating unit sends transaction requests to the authorization unit, and the authorization unit checks the authorization of a user of the operating unit. The authorization unit includes an interface for transmitting the authenticated authentication jobs to the franking unit and the franking unit carries out the authentication of the authorization unit. The franking unit executes transaction jobs, and the franking unit transmits the transaction jobs.

In particular, the operating unit transmits a transaction request to an authorization unit, the authorization unit ascertains an authorization of an user of the operating unit on the basis of an authorization profile, the transmitted transaction request is authenticated by the authorization unit according to the ascertained authorization, the authorization unit converts the authenticated transaction request into a transaction job, the transaction job is transmitted to a franking unit, the transaction job is processed in the franking unit and subsequently, the result of the execution of the transaction job is sent out by the franking unit.

The invention provides a method and a device for franking mailpieces with which franking procedures or other franking-relevant processes are carried out in such a way that they allow the administration of multiple users with different rights.

The invention can be used for any kinds of transaction requests. The term "transaction request" is to be understood in its broadest sense. In particular, the transaction request can be a request to load a charge amount, a request to generate one or more postage indicia or a request for other mailing-relevant information, for example, a request for addresses from an address database.

In particular, the invention proposes for a franking procedure or a franking-relevant transaction to be requested via an operating unit, for this franking request or transaction request to be authenticated in a separate authorization unit, The invention proposes an especially advantageous configuration in which the franking system is modular. In addition to the advantage of recognition of the system and components as well as the ability to develop and implement them independently of each other, there is the special advantage of a great flexibility in the use of the franking system by multiple users.

An especially preferred embodiment of the invention is characterized in that the transaction request is transmitted from the operating unit to the authorization unit, in that the transaction request is authenticated in the authorization unit and in that the authorization unit subsequently transmits an authenticated transaction job to the franking unit.

A special advantage of the inventive separation of the components in franking systems lies in the fact that a so-called cryptographic module can be used in which processes are executed that render the generated postage indicia more forgery-proof. This cryptographic module preferably consists of separate hardware and software. The task of this hardware and software is to store secret or otherwise important data so that it is secure against access and manipulation as well as to execute cryptographic operations such as encryption or signatures in a secure environment. Cryptographic modules of the type specified, for example, in the public standard FIPS 140-2 of the American National Institute of Standards and Technology NIST (see www.nist.gov), are characterized in that any manipulation to the module is detected, results in an interruption of the operations and the deletion of the contents and optionally also causes the destruction of the module. The only reason why electronic franking systems can generate forgery-proof postage indicia is that it is not possible for a user employing a modern franking system with fraudulent intentions to influence or replicate the franking processes that take place in the cryptographic module.

In order to be able to use the functions of the cryptographic module especially effectively, it is advantageous for the interfaces for user interaction that are needed for the operation of the franking system to be accommodated in a separate unit. In this manner, in modern franking systems with which forgery-proof postage indicia can be generated, the operating unit and the franking unit consisting of the cryptographic module are separate from each other.

Another advantage of the separation of the operating unit and the franking unit is that they can be spatially separated from each other. The connection between the operating unit (customer PC) and the franking unit (among other things, the cryptographic module) is established via a data network.

The practical advantage of this physical separation of the operating unit and the franking unit lies in the fact that the forgery-proof postage indicia can be generated on a PC without the use of a cryptographic module that is operated locally on the PC. Instead, the module is inexpensively operated centrally and used by all franking customers on an as-needed basis.

Another advantage of the invention is that it allows the use of various methods for user authentication. In order to ensure that postage indicia with a monetary value are only generated by authorized users, as a rule, franking systems are equipped with access safeguards. In the simplest case, such a safeguard is a secret code that has to be entered when the system is activated. The method of the secret code is used, among other things, in order to safeguard electronic postage meters.

Moreover, it is advantageous to use a pairing between user identification and user authentication. This is carried out, for example, by entering a user name (which serves as the identification) and a password (which serves as the authentication). Here, the security is based on the fact that only the authorized user knows the password.

In addition to knowledge-based security, other authentication methods are also suitable that either call for additional possession of an object or that involve biometric features of the user.

An authentication through possession of an object is used, for example, in security systems based on microprocessor chip cards, so-called SmartCards. Along the lines of a cryptographic module, data is stored on a chip card or operations are carried out that cannot be read out or manipulated. Since such cards cannot be forged or replicated, they lend themselves especially well for secure identification. In addition to such an identification of the chip card, passwords or PINs (personal identification numbers) are routinely used for the authentication of the legitimate owner.

Additional advantageous methods for authentication are based on reading out biometric features of the legitimate user. The objective is to scan unchangeable and unique biometric features—such as the fingerprint or iris pattern—to recognize whether that person is an authorized user. Since the components "knowledge" and "possession" can be dispensed with, biometric methods are viewed as an especially simple, secure and thus future-oriented authentication method.

According to the invention, other information can also be used for identification and authentication purposes.

For example, it is advantageous for an account number of a postage account from which postage values can be loaded to be used as an identification feature.

The authentication of access to the postage account is carried out, for instance, by entering a password.

The information for identification and authentication is used in the authorization unit in order to select the appropriate postage account in the secure cryptographic module on the basis of the account number and to activate the account with the password. Whereas the account number, as an identification feature, has to be visible on the "outside" of the cryptographic module, the password is verified inside the cryptographic module. The verification is carried out inside the module because the entered password (or an image of the password) is compared to a stored password (or to its corresponding image). In order to prevent third parties from reading out the stored password (or its image), it is stored inside the cryptographic module of the franking unit.

Advantageously, the authorization unit and/or the user is authenticated in the cryptographic module of the franking unit.

BRIEF DESCRIPTION OF THE DRAWINGS

Additional advantages, special features and practical refinements of the invention ensue from the subordinate claims and from the presentation below of preferred embodiments making reference to the drawing figures.

The drawing figures show the following.

DETAILED DESCRIPTION

Figure 1:
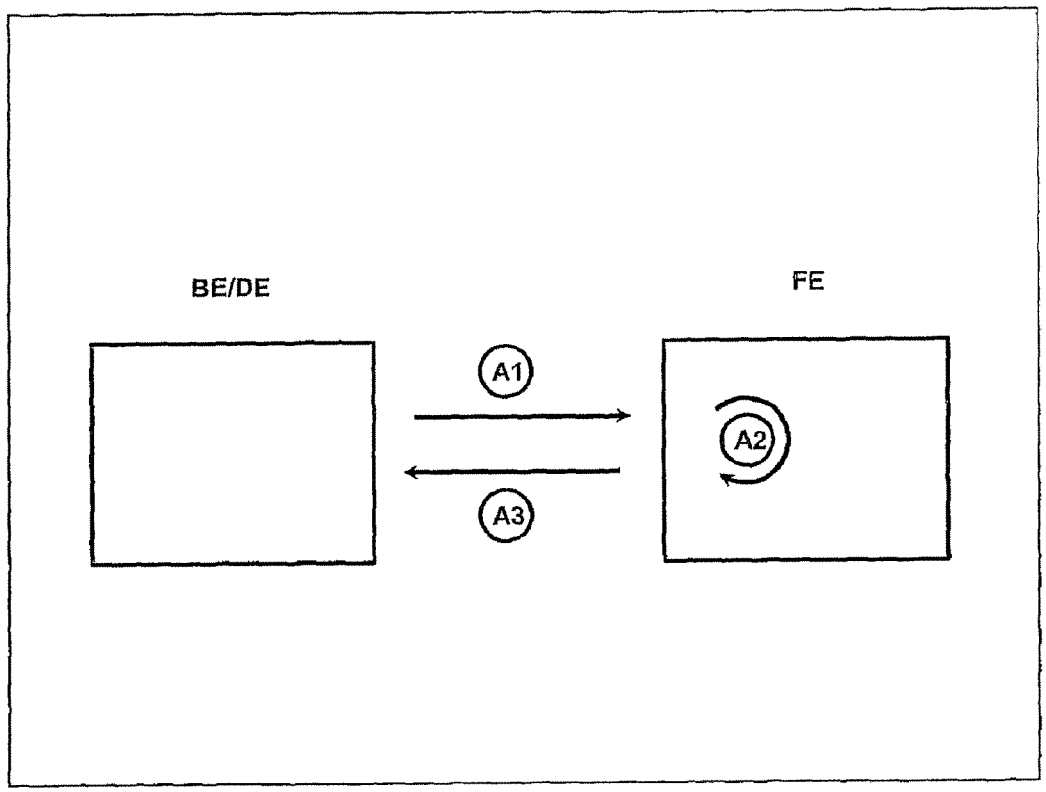
FIG. 1 is a schematic diagram of a franking procedure with user authentication according to the state of the art.

FIG. 1 illustrates the interaction between the operating unit (BE) of the user PC and the franking unit (FE), which is based on the cryptographic module.

In Step A1, an operating unit (BE), which is connected to a printing unit (DE) in the example shown, sends a franking request to the franking unit (FE). In Step A2, after the postage account has been identified, the user is authenticated inside the cryptographic module. Then the franking request is processed in the cryptographic module. As the result, in Step A3, a cryptographically secure byte string is transmitted back to the operating and printing unit (BE/DE) so as to be printed out there as a postage indicium in the form of a machine-readable code.

During the user authentication inside cryptographic modules, one special aspect has to be observed. Since the development work involved in creating cryptographic modules is extremely demanding due to high requirements in terms of the programming discipline and of a complete documentation, cryptographic modules are constructed to be as simple as possible. After all, in view of possible interactions with other program components, every additional functionality would cause the complexity to rise exponentially. Consequently, as a rule, the user authentication inside cryptographic modules is structured simply.

Thus, for instance, the administration of multiple users with different rights and the use of new authentication methods comprising, for example, biometric methods, are not possible with this prior-art franking system.

The problem with all prior-art methods of user authentication in franking systems consists of the fact that the possibilities of user authentication are limited when cryptographic modules are employed in franking systems.

Figure 2:
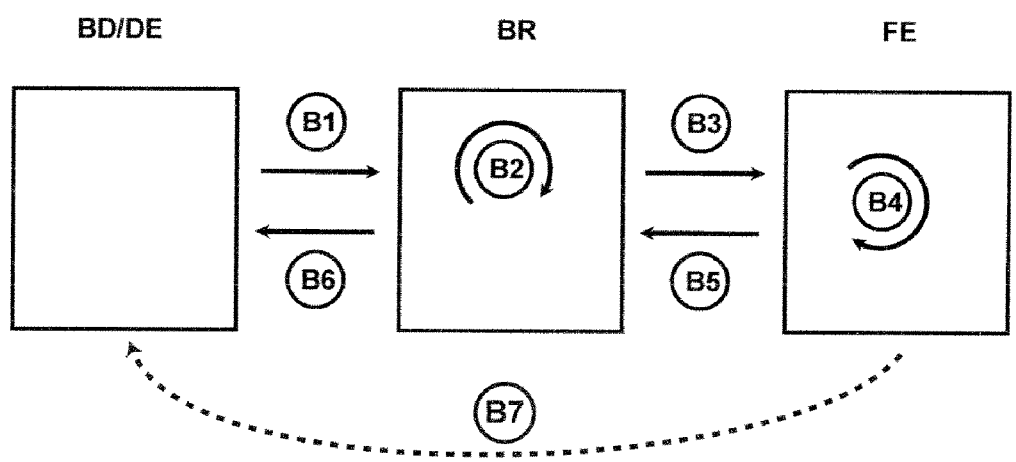
FIG. 2 is a schematic diagram of a franking system according to the invention.

In contrast, the franking system shown in FIG. 2 makes it possible for franking procedures and franking-relevant processes to be carried out in such a way that the administration of multiple users with different rights as well as the use of new authentication methods comprising, for instance, biometric methods, are possible.

Advantageously, this takes place in the franking system according to the invention in that a franking procedure or another franking-relevant transaction is requested via an operating unit (BE), this franking request or transaction request is authenticated in a separate authorization unit (BR), the actual franking or franking-relevant transaction is controlled by the authorization unit (BR), and the result of the franking procedure or of the transaction is transmitted back.

Advantageously, the method is carried out in such a way that the operating unit (BE) is connected to the authorization unit (BR) via a network or data connection.

In this context, it is advantageous for the authorization unit (BR) to be configured in such a way that the authorizations of one or more users at one or more operating units (BE) are stored in said authorization unit (BR).

It is also advantageous for the authorization unit (BR) to be configured in such a way that the authentication of users at operating units (BE) can be carried out by means of one or more authentication methods.

It is advantageous for the authentication method used in the operating unit (BE) to comprise authentication by means of a user name and a password.

Moreover, it is advantageous for the authentication method used in the operating unit (BE) to comprise such methods that call for the possession of identification means.

Furthermore, it is advantageous for the authentication method used in the operating unit (BE) to comprise biometric methods.

Advantageously, the method is carried out in such a way that, after the authentication has been completed, the operating unit (BE) uses the stored authorization rules to check the franking request coming from the user or the request for the franking-relevant transaction.

Moreover, it is advantageous for the franking request coming from the user or the request of the franking-relevant transaction to be converted in such a way that the franking system is actuated.

Here, it is advantageous for the authorization unit (BR) to be connected to the franking system via a network or data connection.

It is advantageous for the franking system to carry out an authentication of the authorization unit (BR).

Moreover, it is advantageous for the franking system to generate the postage indicium or to execute the franking-relevant process and to transmit the result back directly or indirectly in such a way that a postage indicium can be printed out or the transaction information can be transmitted back.

Furthermore, it is advantageous for the stipulation of the authentication rules on the authorization unit (BR) to be carried out by special administrators.

The invention comprises a digital franking system which is characterized in that postage procedures, postage loading and other franking-relevant transactions can be executed by users with different levels of authorization. The system is to be marketed under the name STAMPIT professional.

In particular, the invention allows a comprehensive user administration with which different authorizations can be issued for different users. Especially the access to postage accounts can be carried out for various users independently of each other. Advantageously, the user administration takes place in the authorization unit (BR).

For this purpose, it is especially advantageous that one authorization profile is stored in the authorization unit (BR) for each authorized user of the operating unit (BE).

User rights are primarily based on the fact that defined users are granted the right to execute franking. The right to generate postage indicia is related to specific postage accounts and the maximum amount can be limited. The setting of a maximum franking limit can be additionally related to specific periods of time. In particular, this means that different amounts of the franking volume permissibe within a certain period of time can be defined individually for different users.

The result is that, by introducing a user administration according to the invention, it is possible to appoint persons in large companies who can execute franking and postage loading procedures of a certain scope. In this manner, for example, interns working temporarily at the company can be given different franking authorizations than the authorized officer of the company and his secretarial personnel. By the same token, the authorization to acquire new postage values that can be used for franking can be limited to just a few people. Limitations are likewise possible pertaining to loading volumes and periods of time.

The specification of the persons and their authorizations is laid down by one or more administrators in the user administration or in the authorization unit.

Using the system described above and depicted in a schematic diagram in FIG. 2, franking procedures can be carried out in different ways.

The process steps described below are especially practical for a particularly advantageous configuration of the franking system.

In Step B1, a transaction request, especially a franking request, is sent from an operating unit (BE)—which is connected to a printing unit (DE) in the example shown—to the authorization unit (BR). In an especially preferred embodiment of the invention, the transaction request or the franking request is a job to carry out one or more franking procedures. However, it is likewise advantageous for the transaction request B1 to serve to load postage amounts from a value transfer center.

In Step B2, an authentication of the user is carried out by means of one or more of the authentication methods shown.

On the basis of the authorizations (BR) of this user as stored in the authorization unit (BR) or in a storage unit associated with it, in Step B3, a franking request is sent to the franking unit (FE) if it has previously been ascertained that the franking request conforms with the authorization profile of the user.

In the franking unit (FE), a verification procedure is carried out to check whether the authorization unit (BR) is authorized to authorize users and/or transaction requests transmitted by the users.

In an especially preferred embodiment of the invention, the authorization unit (BR) checks not only the authorization of the user but also his authorization to manage a postage account associated with him.

After the postage account of the user has been identified in Step B4, the authentication of the authorization unit (BR) is carried out inside the cryptographic module.

After the authentication of the authorization unit (BR), the transaction job is preferably likewise processed in the franking unit (FE).

The result of the execution of the transaction job is preferably transmitted back as a cryptographically secure byte string in Steps B5 and B6 indirectly (via the authorization unit (BR)) or, in step B7, directly to the operating and printing unit (BE/DE) in order to be printed there as a postage indicium in the form of a machine-readable code.

The invention thus provides a method for franking mailpieces as well as a franking system by means of which transaction requests from various users can be handled flexibly and by means of which a high level of protection against fraud is additionally achieved.

LIST OF REFERENCE NUMERALS

A1 sending a franking request to the franking unit (FE)
A2 authentication of the user
A3 transmission of a cryptographically secure byte string to the operating and printing unit (BE/DE)
B1 transmission of a franking request from the operating unit (BE) to the authorization unit (BR)
B2 authentication of the user
B3 sending a franking request to the franking unit (FE)
B4 authentication of the authorization unit (BR) by the franking unit (FE)
B5 transmission of the result of the execution of a transaction job to the authorization unit (BR)
B6 transmission of a message containing the result of the execution of the transaction job to the operating unit (BE) and/or to the printing unit (DE) and/or another one of the depicted preferred authentication methods
BE operating unit
BR authorization unit
DE printing unit
FE franking unit

The invention claimed is:

1. A method for franking mailpieces, wherein an operating unit is operated separately from a franking unit, the method comprising:
the operating unit transmits a transaction request to an authorization unit,
the authorization unit ascertains an authorization of a user of the operating unit on the basis of an authorization profile, one authorization profile being stored in the authorization unit for each authorized user of the operating unit and different authorization profiles are stored in the authorization unit for different users,
the authorization unit authenticates the transmitted transaction request in response to the ascertained authorization,
the authorization unit converts the authenticated transaction request into a transaction job,
transmitting the transaction job to the franking unit, the authorization unit being connected to the franking unit via a network,
the franking unit authenticates the authorization unit,
processing the transaction job in the franking unit,
subsequently, the franking unit sends out the result of the execution of the transaction job, and
wherein at least one authorization profile stored in the authorization unit differs in scope from at least one other authorization profile stored in the authorization unit.

2. The method according to claim 1, comprising transmitting the transaction request from the operating unit to the authorization unit, authenticating the transaction request in the authorization unit and the authorization unit subsequently transmitting an authenticated transaction job to the franking unit.

3. The method according to claim 1, comprising transmitting the result of the transaction job to the authorization unit and the authorization unit transmitting a message containing the result of the execution of the transaction job to at least one of the operating unit and a printing unit.

4. The method according to claim 1, comprising the franking unit sending the result of the execution of the transaction job directly to at least one of the operating unit and the printing unit.

5. The method according to claim 1, comprising the franking unit sending the result of the execution of the transaction job to the authorization unit and the authorization unit transmitting a message containing the result of the execution of the transaction job to at least one of the operating unit and the printing unit.

* * * * *